Feb. 22, 1955

S. S. MIMS

Re. 23,953

DEHORNING DEVICE

Original Filed April 26, 1950

INVENTOR:
SAMUEL STEWART MIMS
BY Edw. T. Newton
ATTORNEY

United States Patent Office

Re. 23,953

Reissued Feb. 22, 1955

23,953

DEHORNING DEVICE

Samuel S. Mims, Washington, D. C., assignor of one-third to Lykes M. Boykin, Alexandria, Va.

Original No. 2,582,450, dated January 15, 1952, Serial No. 158,203, April 26, 1950. Application for reissue September 11, 1953, Serial No. 379,749

8 Claims. (Cl. 128—303.1)

Matter enclosed in heavy brackets [ ] appears in the original patent but forms no part of this reissue specification; matter printed in italics indicates the additions made by reissue.

This invention relates to a dehorning device, and more particularly to a *cauterizing* device for simplifying the dehorning of cattle and other livestock.

Previously in order to dehorn livestock by destroying the horn cells at the base of the horn button on these animals a caustic stick was wetted and rubbed on the horn button or a caustic paste was applied to the horn button when the animal was quite young, say from two to four weeks old; and more recently apparatus has been devised for destroying the horn cells by heat, an example of such apparatus being shown in my co-pending application, Ser. No. 125,321, filed November 3, 1949, and now Patent No. 2,569,250 dated September 25, 1951. In attempting to use heat, difficulty has been experienced in adapting means for heating the dehorning device that would be safe, convenient and always available. Burning charcoal is neither safe or convenient, and electricity is not always available, particularly out on the range.

It is an object of my present invention to provide a [dehorning] *cauterizing* device which is chemically heated.

Another object of my invention is to provide a dehorning device which is adapted to be heated by a replaceable chemical cartridge.

Another object of my invention is to provide a dehorning device having a cylindrical tip which is quickly and easily interchangeable with tips of various sizes to accommodate animals having horns of various sizes.

Another object of my invention is to provide a dehorning device with an improved shield for protecting the operator and retaining the heat in the desired portions of the device.

Other and further objects and advantages of my invention will be apparent from the following description taken in connection with the accompanying drawing wherein like characters of reference designate corresponding parts throughout the several views, and wherein.

Figure 1:
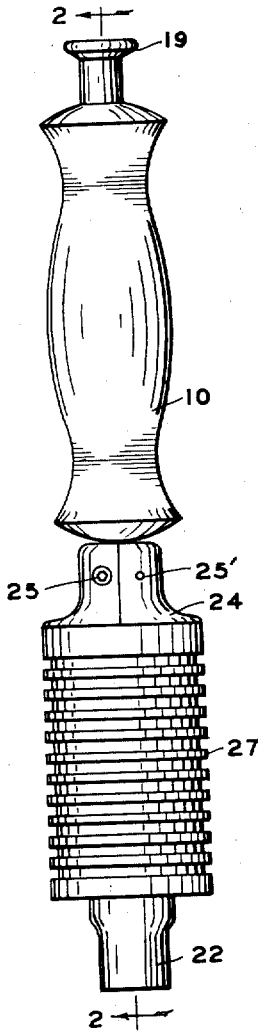
Fig. 1 is an elevation illustrating an embodiment of my invention.
Figure 2:
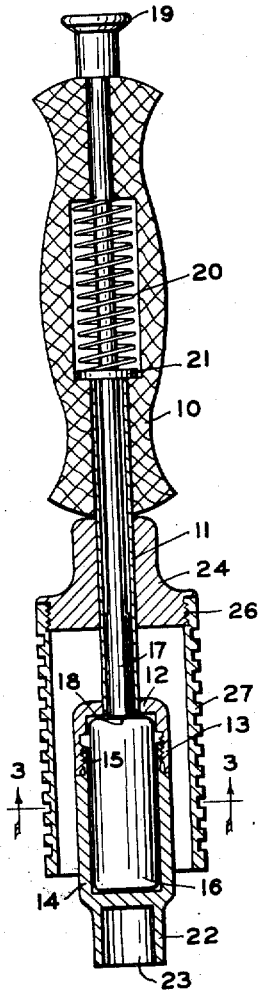
Fig. 2 is a cross-sectional view taken along the line 2—2 of Fig. 1.
Figure 3:
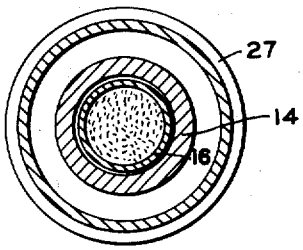
Fig. 3 is a cross-sectional view taken along the line 3—3 of Fig. 2.

In the embodiment chosen for illustration, a hollow handle 10 is provided with a barrel *or elongated connecting member* 11 extending from one end thereof and upon the outer end of which is mounted a combustion chamber base 12 *comprising radially extending wall means.* The base 12 is internally threaded at 13 to receive a combustion chamber extension 14 which is externally threaded at 15 for removable attachment to the threaded portion of the combustion chamber base 12. When the extension 14 is attached to the base 12 they form a hollow *cylindrical* combustion chamber for the reception of an hermetically sealed heating charge 16 which liberates heat, but substantially no gas, when fired. *The chamber is defined by a cylindrical peripheral wall and end walls which are substantially perpendicular to such peripheral wall.* An example of such a heating charge is shown in U. S. Patent No. 2,500,790, issued March 14, 1950.

A movable plunger rod 17 is mounted in the barrel 11 and carries on one end thereof a firing pin 18 which extends into the combustion chamber and is arranged to detonate the percussion primer (not shown) in the end of the heating charge 16 for igniting the same. The rod 17 extends through the handle 10 and has an enlarged grip portion 19 on the end opposite the firing pin 18. A coil spring 20 surrounds an intermediate portion of the rod 17 within the handle 10 and presses against the collar 21, fixed to the rod 17, to urge the firing pin toward the combustion chamber.

Fixed to the outer end of the combustion chamber extension 14 *at the end wall thereof* is a protruding tip 22 of cylindrical shape and having a recess or opening 23 at its outer end to receive the horn button, *the tip comprising an open annulus raised from the surface of the end wall,* the depth and diameter of the opening 23 being proportioned according to the size of the horn button and the rim of the head surrounding the opening 23 being of sufficient thickness to supply a branding area which will reach all the horn cells embedded around and near the base of the horn button, and which, when heated to a temperature of about 670 degrees F. is sufficient to destroy the horn cells.

A split collar 24 is rigidly attached to the barrel 11 intermediate the handle 10 and the combustion chamber base 12, the split halves being secured together and in place on the barrel by means of through-bolts 25, 25'. The collar 24 is externally threaded at 26 to receive an internally threaded cylindrical shield 27 which is radially spaced from the combustion chamber base 12 and the combustion chamber extension 14, and overhangs the combustion chamber to provide a protection for the operator against accidental burns while at the same time defining an air space for retaining heat in the combustion chamber extension for conduction to the tip 22. Also, the air space provided between the shield 27 and the combustion chamber will prevent oxidation and a consequent forming of carbon on the tip 22 which may be formed of copper or bronze or other material of high heat conductivity. The shield 27 may be formed of aluminum or other suitable light weight material, and the handle 10 should be formed of wood or other suitable material of low heat conductivity.

Having selected a combustion chamber extension with a tip of suitable dimensions for receiving the horn button of the animal to be dehorned, a heating charge is placed in the combustion chamber extension and the same screwed in place on the combustion chamber base. The device is then ready for use, and with the animal to be dehorned caught and held, the plunger rod is pulled back by the grip 19 against the action of spring 20 and released to drive the firing pin 18 to detonate the percussion primer of the heating charge 16. The heating charge in the combustion chamber will then quickly heat the dehorning tip 22 to a temperature of about 670 degrees F. which is sufficient to destroy the horn cells when the tip is pressed about the horn button so that it is received within the opening 23 in the free end of the dehorning tip. When the heat from the charge has been dissipated, the combustion chamber extension can be unscrewed from the base and another charge easily inserted in the combination chamber.

It will be obvious that my invention provides a needed article of great convenience and usefulness, and that while I have illustrated and described only a single embodiment thereof various changes and adaptations may be made without departing from the scope of my invention as defined in the appended claims.

I claim:

1. In a dehorning device, a barrel, a hollow handle mounted on one end of said barrel, a combustion chamber base secured to the other end of said barrel, a combustion chamber extension constructed and arranged for removable connection with said combustion chamber base to form a combustion chamber to receive a combustible heating charge, a plunger mounted for reciprocating movement in said barrel, one end of said plunger extending outwardly from the end of said handle farthest from said combustion chamber base, a firing pin on the other end of said plunger, an hermetically sealed heating charge in said combustion chamber, said heating charge having a percussion primer arranged for detonation by said firing pin, a dehorning tip on said combustion chamber extension, said tip being of cylindrical shape and having a recess at its outer end to receive a horn button, a split collar on said barrel intermediate said handle and said combustion chamber base, and a cylindrical shield attached to said collar and extending over said combustion chamber, said shield being radially spaced from said combustion chamber.

2. In a dehorning device, a barrel, a hollow handle mounted on one end of said barrel, a combustion chamber base secured to the other end of said barrel, a combustion chamber extension constructed and arranged for removable connection with said combustion chamber base to form a combustion chamber to receive a combustible heating charge, a plunger mounted for reciprocating movement in said barrel, a firing pin on said plunger, an hermetically sealed heating charge in said combustion chamber, said heating charge having a percussion primer arranged for detonation by said firing pin, a dehorning tip on said combustion chamber extension, said tip being of cylindrical shape and having a recess at its outer end to receive a horn button, a split collar on said barrel intermediate said handle and said combustion chamber base, and a cylindrical shield attached to said collar and overhanging said combustion chamber, said shield being radially spaced from said combustion chamber.

3. In a dehorning device, a barrel, a handle mounted on one end of said barrel, a combustion chamber base secured to the other end of said barrel, a combustion chamber extension constructed and arranged for removable connection with said combustion chamber base to form a combustion chamber to receive a combustible heating charge, a plunger mounted for reciprocating movement in said barrel, a firing pin on said plunger, an hermetically sealed heating charge in said combustion chamber, said heating charge having a percussion primer arranged for detonation by said firing pin, a dehorning tip on said combustion chamber extension, said tip being of cylindrical shape and having a recess at its outer end to receive a horn button, a split collar on said barrel intermediate said handle and said combustion chamber base, and a cylindrical shield attached to said collar and extending about said combustion chamber and radially spaced therefrom.

4. In a dehorning device, a barrel, a handle mounted on one end of said barrel, a combustion chamber base secured to the other end of said barrel, a combustion chamber extension constructed and arranged for removable connection with said combustion chamber base to form a combustion chamber to receive a combustible heating charge, a heating charge in said combustion chamber, said heating charge having a percussion primer arranged for detonation, a dehorning tip on said combustion chamber extension, said tip having a recess at its outer end to receive a horn button, and a cylindrical shield attached to said barrel and extending about said combustion chamber in radially spaced relationship thereto.

5. In a dehorning device, an intermediate portion, a handle mounted on one end of said intermediate portion, a combustion chamber base secured to the other end of said intermediate portion, a combustion chamber extension removably connected to said combustion chamber base to form a combustion chamber to receive a combustible heating charge, a heating charge in said combustion chamber, means for igniting said heating charge, a dehorning tip on said combustion chamber extension, said tip having a recess at its outer end to receive a horn button, and a cylindrical shield extending about said combustion chamber in radially spaced relationship thereto.

6. In a dehorning device, a connecting member, a handle mounted on one end of said member, a combustion chamber base secured to the other end of said member, a combustion chamber extension removably connected to said combustion chamber base to form a combustion chamber to receive a combustible heating charge, a dehorning tip on said combustion chamber extension, said tip having a recess to receive a horn button, and a shield surrounding said combustion chamber, said shield being radially spaced from said combustion chamber.

*7. In a dehorning device, an elongated connecting member, a handle mounted on one end of said member, radially extending wall means mounted on the other end of said member, combustion chamber forming means removably mounted on said wall means, said wall means and said combustion chamber forming means defining a cylindrical chamber having a cylindrical peripheral wall and end walls substantially perpendicular thereto for receiving a combustible heating charge, and a dehorning tip carried by one of said end walls, said dehorning tip comprising an annulus raised from the surface of said one end wall and defining a horn button receiving recess in said dehorning tip.*

*8. In a cauterizing device, a handle, a first combustion chamber wall means, means connecting said handle to said first combustion chamber wall means, a second combustion chamber wall means removably attached to said first combustion chamber wall means and defining therewith a substantially closed combustion chamber for receiving a combustible charge, movable means for firing such charge, said movable means being arranged to pass through one of said wall means during firing, and a cauterizing element carried by one of said wall means, said element comprising an open annulus defining a recess in said element.*

References Cited in the file of this patent or the original patent

UNITED STATES PATENTS

| | | |
|---|---|---|
| 1,560,971 | Bula | Nov. 10, 1925 |
| 2,004,832 | Roberts | June 11, 1935 |
| 2,288,464 | Kitchener | June 30, 1942 |
| 2,589,509 | Petraglia | Mar. 18, 1952 |